United States Patent
Claudatos et al.

(10) Patent No.: US 8,086,255 B2
(45) Date of Patent: *Dec. 27, 2011

(54) DATA MESSAGE PROCESSING

(75) Inventors: Christopher H. Claudatos, San Jose, CA (US); William D. Andruss, Minneapolis, MN (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/798,730

(22) Filed: Apr. 8, 2010

(65) Prior Publication Data

US 2010/0197329 A1 Aug. 5, 2010

Related U.S. Application Data

(63) Continuation of application No. 10/936,442, filed on Sep. 7, 2004, now Pat. No. 7,725,098.

(60) Provisional application No. 60/500,725, filed on Sep. 4, 2003.

(51) Int. Cl.
*H04W 4/00* (2009.01)

(52) U.S. Cl. ..... 455/466; 455/458; 455/411; 455/414.1; 709/206; 379/88.22

(58) Field of Classification Search ................. 455/466, 455/458, 414.1, 410–411; 709/203–206
See application file for complete search history.

(56) References Cited

U.S. PATENT DOCUMENTS

| | | | |
|---|---|---|---|
| 5,557,655 A * | 9/1996 | Lantto | 455/433 |
| 5,878,351 A * | 3/1999 | Alanara et al. | 455/466 |
| 5,983,096 A | 11/1999 | Lietha et al. | |
| 6,028,917 A | 2/2000 | Creamer et al. | |
| 6,085,099 A * | 7/2000 | Ritter et al. | 455/466 |
| 6,163,546 A * | 12/2000 | Sipila | 370/466 |
| 6,167,513 A * | 12/2000 | Inoue et al. | 713/150 |
| 6,678,516 B2 * | 1/2004 | Nordman et al. | 455/414.1 |
| 6,721,416 B1 | 4/2004 | Farrell | |
| 6,760,421 B2 | 7/2004 | Heilmann et al. | |
| 7,330,717 B2 * | 2/2008 | Gidron et al. | 455/418 |
| 7,392,297 B2 * | 6/2008 | Ozaki et al. | 709/219 |
| 7,457,404 B1 | 11/2008 | Hession et al. | |
| 7,715,819 B2 * | 5/2010 | Rockwell | 455/404.1 |
| 7,725,098 B1 * | 5/2010 | Claudatos et al. | 455/411 |
| 2001/0043697 A1 | 11/2001 | Cox et al. | |
| 2002/0037075 A1 | 3/2002 | Flanagan | |
| 2002/0054587 A1 | 5/2002 | Baker et al. | |

(Continued)

FOREIGN PATENT DOCUMENTS

CN 1303184 A 7/2001

(Continued)

OTHER PUBLICATIONS

U.S. Appl. No. 11/173,174, filed Jun. 30, 2005, Claudatos et al.

(Continued)

*Primary Examiner* — Sharad Rampuria
(74) *Attorney, Agent, or Firm* — Van Pelt, Yi & James LLP

(57) ABSTRACT

Processing data messages is disclosed. A mobile data message is received. It is determined whether the mobile data message requires communication policy compliance handling. The mobile data message or a copy thereof is sent to a communication policy compliance destination if it is determined that the mobile data message requires communication policy compliance handling.

20 Claims, 13 Drawing Sheets

U.S. PATENT DOCUMENTS

| | | | |
|---|---|---|---|
| 2002/0138652 A1 * | 9/2002 | Taylor | 709/246 |
| 2002/0198950 A1 | 12/2002 | Leeds | |
| 2004/0170268 A1 | 9/2004 | Hakusui | |
| 2010/0115038 A1 * | 5/2010 | McEachern et al. | 709/206 |
| 2010/0159883 A1 * | 6/2010 | Pascal et al. | 455/412.1 |

FOREIGN PATENT DOCUMENTS

| | | |
|---|---|---|
| CN | 1072420 C | 10/2001 |
| CN | 1342278 A | 3/2002 |
| EP | 1083765 A2 | 3/2001 |
| WO | WO 0056015 | 9/2000 |

OTHER PUBLICATIONS

U.S. Appl. No. 11/174,288, filed Jun. 30, 2005, Claudatos et al.

* cited by examiner

DATA MESSAGE PROCESSING

CROSS REFERENCE TO OTHER APPLICATIONS

This application is a continuation of U.S. patent application Ser. No. 10/936,442, entitled DATA MESSAGE PROCESSING filed Sep. 7, 2004, now U.S. Pat. No. 7,725,098 which is incorporated herein by reference for all purposes, which claims priority to U.S. Provisional Patent Application No. 60/500,725 entitled SMS MESSAGE PROCESSING filed Sep. 4, 2003 which is incorporated herein by reference for all purposes.

Issued U.S. Pat. No. 7,095,829 entitled DATA MESSAGE MIRRORING AND REDIRECTION filed Sep. 7, 2004, is incorporated herein by reference for all purposes; and U.S. Pat. No. 7,450,937 entitled MIRRORED DATA MESSAGE PROCESSING filed Sep. 7, 2004, is incorporated herein by reference for all purposes.

FIELD OF THE INVENTION

The present invention relates generally to data messages. More specifically, mirrored data message processing is disclosed.

BACKGROUND OF THE INVENTION

In many contexts, an enterprise or other stakeholder may be required and/or may desire to keep track of and/or exercise control over network or other communications, e.g., communications among employees of a corporation and/or between such employees and third parties, such as the corporation's customers and/or members of the general public. The requirements of the Securities and Exchange Commission, National Association of Securities Dealers, HIPAA, Sarbanes-Oxley Act of 2002, and various anti-harassment and anti-discrimination laws are among the many legal and regulatory requirements that may give rise to a need on the part of a corporation or other entity to be able to monitor, record, archive, index, retrieve, analyze, and/or control employee (or other user) communications.

The task of monitoring and controlling communications is made more challenging by the proliferation in recent years of communication technologies, such as chat, instant messaging, and short message service (SMS) technology (the basic text character form of which is sometimes referred to as "text messaging", e.g., via a mobile phone or other mobile device), and technologies related to SMS such as Enhanced Message Service (EMS) and Multimedia Message Service (MMS), which enable longer messages and rich, multimedia content such as video to be sent. Data messaging technologies that use a mobile network, such as SMS and other mobile network-based messaging technologies, can present a particular challenge, because the equipment used to receive, process, and deliver a message may depend on the geographic location of the user at the time the user sends the message. As a result, in a typical prior art mobile network it is not uncommon for mobile data messages to be delivered via a communication path that does not include any equipment through which the mobile data message transits and/or on which a copy of the mobile data message persists such as may be suitable and/or convenient to enable a communication policy to be applied to the mobile data message.

Furthermore, some data messaging technologies use available bandwidth on a communication channel to opportunistically transmit data messages, e.g., at times when the communication channel is not busy transferring data associated with a primary type of communication for which the communication channel primarily is used. For example, mobile telephones and associated service provider infrastructure are used, or at least were provided originally, primarily to support full duplex voice communication between two or more stations, at least one of them being (or being capable of being) mobile (e.g., wireless). SMS messaging and related technologies opportunistically use available bandwidth on mobile communication channels to allow users to send and/or receive secondary data messages, such as text messages. Such secondary messages may be stored by a service provider until an opportunity arises to forward them to their intended recipient, e.g., once the recipient comes into range of an element of the mobile network and/or turns their mobile equipment on. Even if a way were provided to archive, monitor, and/or control the primary type of communications on such networks, the approach used for the primary type of communication may not be suitable for performing such functions with respect to the secondary data messaging traffic. Also, different rules may apply to the different types of communication, e.g., to the extent the secondary data communication is considered to be a communication "in writing" and/or may be more likely to persist, be forwarded, etc.

Therefore, there is a need for an effective way to monitor and/or control communications via data messages, including without limitation communications made using mobile and/or secondary data messaging technology.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Processing data messages is disclosed. In one embodiment, a mobile data message is received. It is determined whether policy compliance processing is required to be performed on the message. If policy compliance processing is required to be performed, the mobile data message, or a copy thereof, is forwarded to a policy compliance destination.

Figure 1:
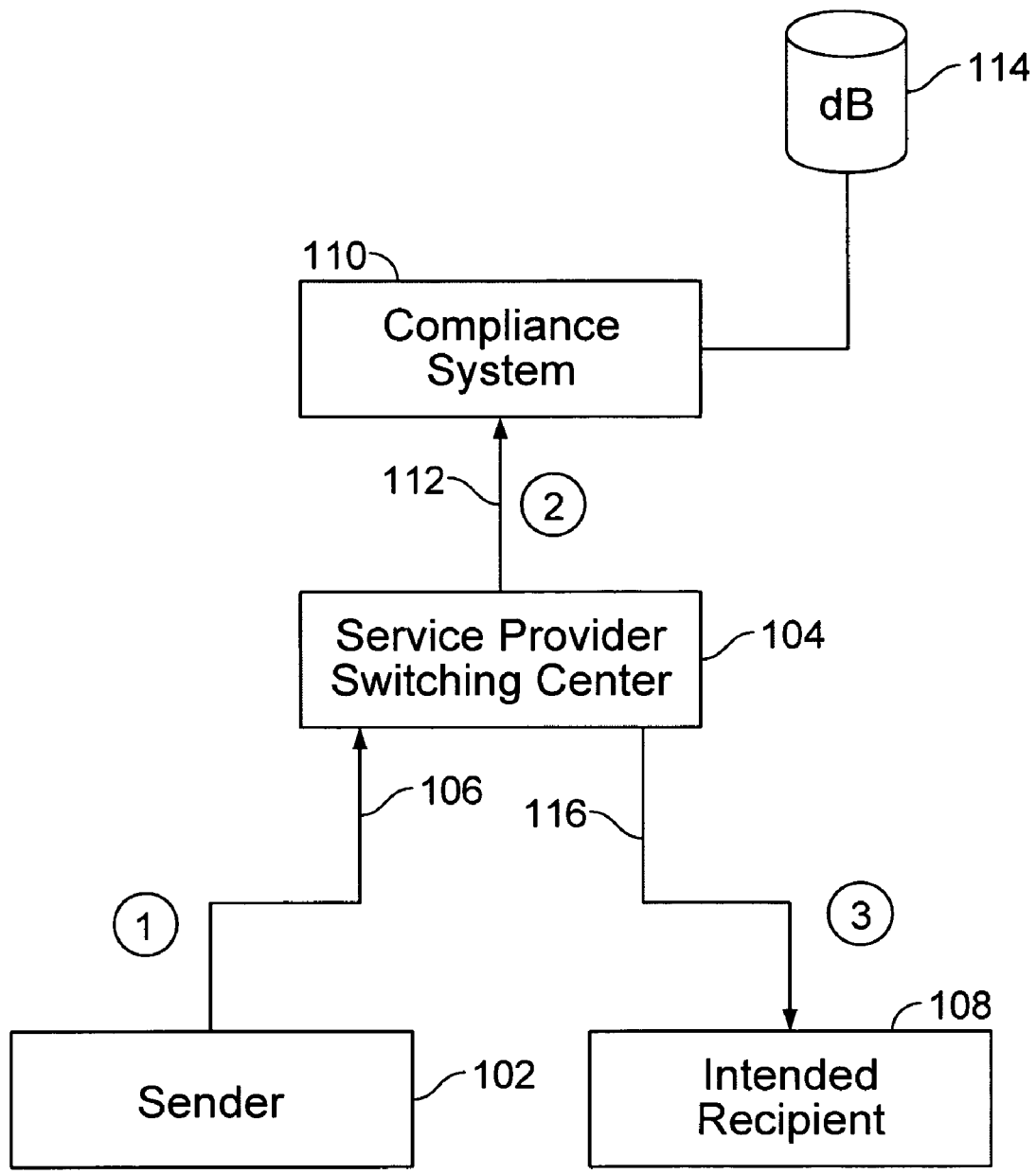
FIG. 1 is a block diagram illustrating data message mirroring as implemented in one embodiment.

FIG. 1 is a block diagram illustrating data message mirroring as implemented in one embodiment. A sender 102 generates and sends to a service provider switching center 104 via a communication path 106 a data message addressed to an intended recipient 108.

In one embodiment, the data message comprises a mobile data message. The term "mobile data message" as used herein refers to any data message transmitted at least in part via a mobile or wireless communication network, and specifically includes such messages even though they originate from and/or terminate at a non-mobile and/or non-wireless equipment. The term "mobile network" is used herein to refer to a communication network in which one or more sending and/or receiving nodes may connect to the network from more than one physical location (e.g., from two or more different geographic locations). The term "wireless network" as used herein refers to a communication network in which one or more sending and/or receiving nodes may connect to the network via wireless communication. Typically, a wireless network is also a mobile network because at least in theory a node configured to communicate via wireless communication can be moved to a different physical location and still access the wireless network. Except as specified, a wireless network may be substituted for a mobile network in embodiments described herein and vice versa.

In one embodiment, the data message comprises a secondary data message. As used herein, the term "secondary data message" refers to a data message of a type that is different than a primary type of communication for which at least a portion of the communication path used to transmit the secondary data message was at least initially designed and/or intended, which secondary data message is transmitted opportunistically using communication channel bandwidth that is not being used at a given time to transmit a communication of the primary type. An SMS or similar message (e.g., text message) sent to or from mobile/wireless telephones is an example of a "secondary data message" as that term is used herein.

In one embodiment, sender 102 comprises a mobile communication equipment, such as a mobile telephone and the service provider switching center 104 comprises a mobile switching center (MSC) that is part of a mobile network operated by a mobile telecommunication service provider of which the sender 102 (or some person or entity acting on behalf of sender 102) is a subscriber. In other embodiments, not shown in FIG. 1, the operations described herein as being performed by service provider switching center 104 may in addition and/or instead be performed by one or more other network elements capable of handling, processing, and/or routing/switching messages. In the example shown in FIG. 1, the switch center 104 is configured to send a mirrored copy of the data message to a compliance system 110 via a communication path 112. In one embodiment, at least a portion of communication path 112 is part of the same network as communication path 106. For example, in one embodiment both sender 102 and compliance system 110 are nodes accessible via the same mobile network. In one embodiment, at least a portion of communication path 112 is part of a different network than communication path 106. For example, in one embodiment sender 102 may comprise a mobile communication equipment that accesses service provider switching center 104 via a mobile network, whereas communication path 112 may comprise a communication via a different network, such as an electronic mail message sent via the Internet or data transferred via modem over the public switched telephone network (PSTN) and/or some other public or private network. In one embodiment, compliance system 110 is equipment associated with the service provider with which switching center 104 is associated. The compliance system 110 is connected to a database 114 and in one embodiment is configured to store at least selected mirrored data messages in database 114. In the example shown, in addition to sending a copy of the data message to compliance system 110, switching center 104 delivers the original data message to its intended recipient 108 via communication path 116. In one embodiment, at least a portion of communication path 116 comprises part of the same network as communication path 106. In one embodiment, at least a portion of communication path 116 comprises part of a network of the same type as communication path 106; e.g., both sender 102 and intended recipient 108 may be mobile equipments but they may be serviced by different provider networks. In one embodiment, the switching center 104 sends the original data message to its intended recipient 108 only after sending a copy to compliance system 110. In one embodiment, the switching center 104 sends the original data message to its intended recipient 108 prior to sending a copy to compliance system 110. In one embodiment, the switching center 104 sends the original data message to its intended recipient 108 at substantially the same time as it sends a copy to compliance system 110.

Figure 2:
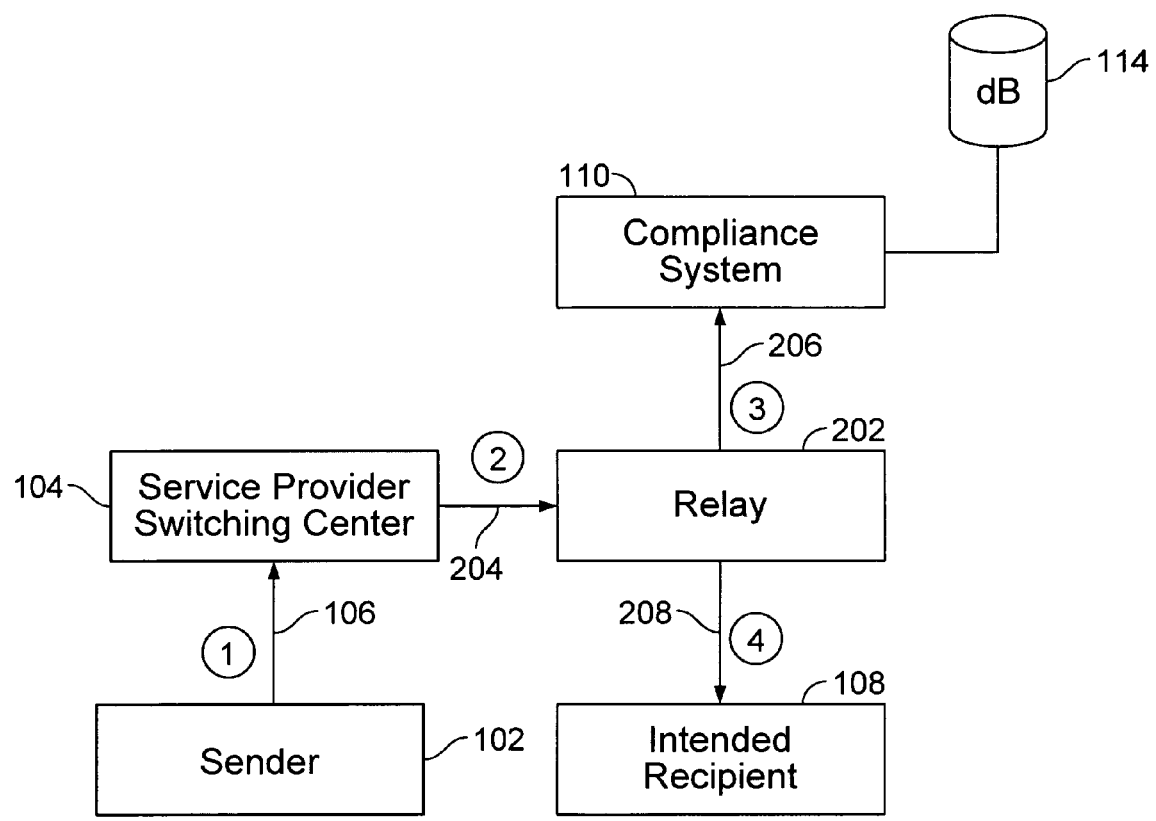
FIG. 2 is a block diagram illustrating data message mirroring as implemented in one embodiment.

FIG. 2 is a block diagram illustrating data message mirroring as implemented in one embodiment. In this example, the switching center 104 redirects the data message received from sender 102 and addressed to intended recipient 108 to a relay 202 via a communication path 204. Relay 202 sends a copy of the data message to compliance system 110 via communication path 206 and delivers the original data message to intended recipient 108 via communication path 208. In one embodiment, relay 202 is part of the same service provider network as switching center 104. In one embodiment, relay 202 is operated by a trusted third party. In one embodiment, switching center 104 is configured to redirect to relay 202 all messages sent by sender 102. In one embodiment, switching center 104 is configured to redirect to relay 202 all messages sent to intended recipient 108. In one embodiment, switching center 104 is configured to selectively redirect to relay 202 messages sent by sender 102, based on criteria such as data associated with the intended recipient of the message (e.g., destination address), the source address-destination address pair, message contents, etc. In one embodiment, relay 202 forwards to compliance system 110 a copy of each data message received from switching center 104. In one alternative embodiment, relay 202 selectively forwards to compliance system 110 a copy of a received data message based on such criteria as the sender, the intended recipient, and/or the contents of the message.

Figure 3:
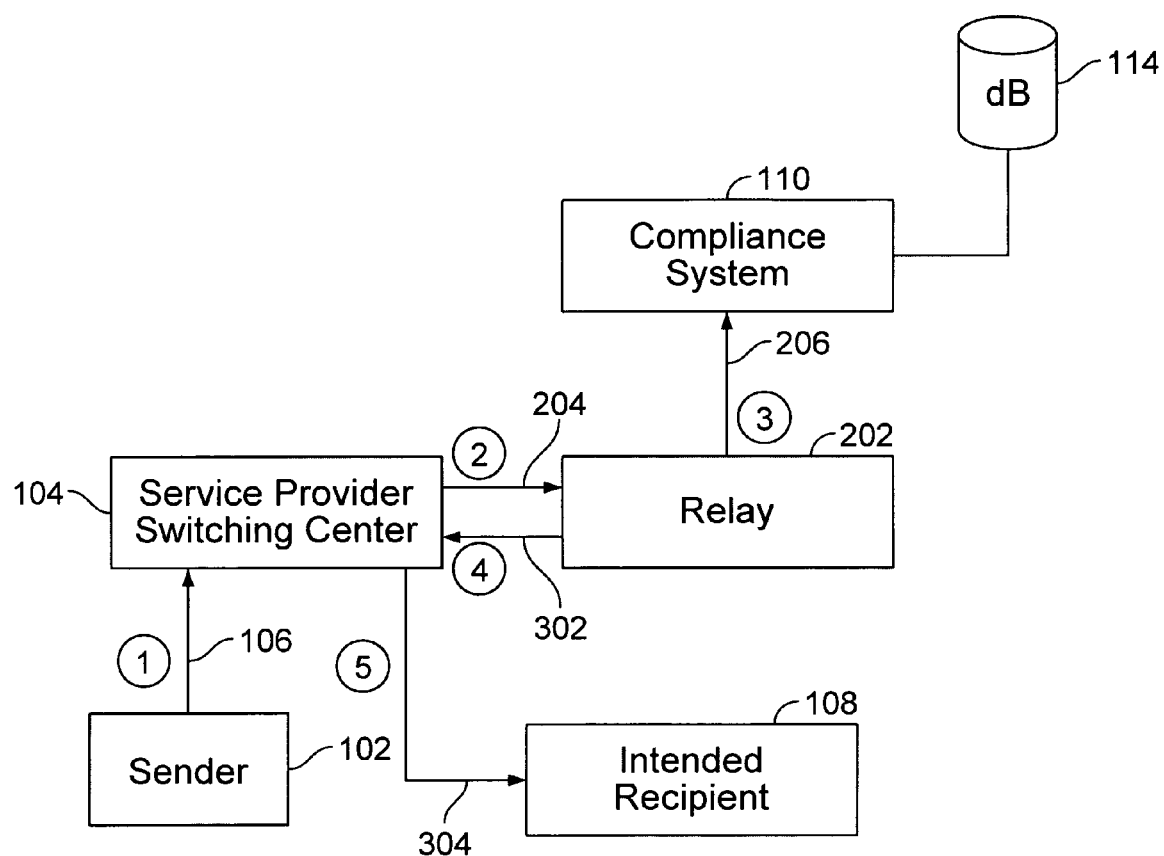
FIG. 3 is a block diagram illustrating data message mirroring and/or redirection as implemented in one embodiment.

FIG. 3 is a block diagram illustrating data message mirroring and/or redirection as implemented in one embodiment. In this example, the relay 202 delivers the original data message by sending the data message back to the switching center 104 via a communication path 302. In one embodiment, the relay 202 sends the original message back to the switching center 104 for delivery to the intended recipient 108 once the relay 202 has received from compliance system 110 confirmation that the copy of the data message sent to compliance system 110 by relay 202 was received. In one embodiment, the relay 202 sends the original message back to the switching center 104 for delivery to the intended recipient 108 once the relay 202 has received from compliance system 110 an indication that the data message is authorized to be delivered to intended recipient 108.

Figure 4:
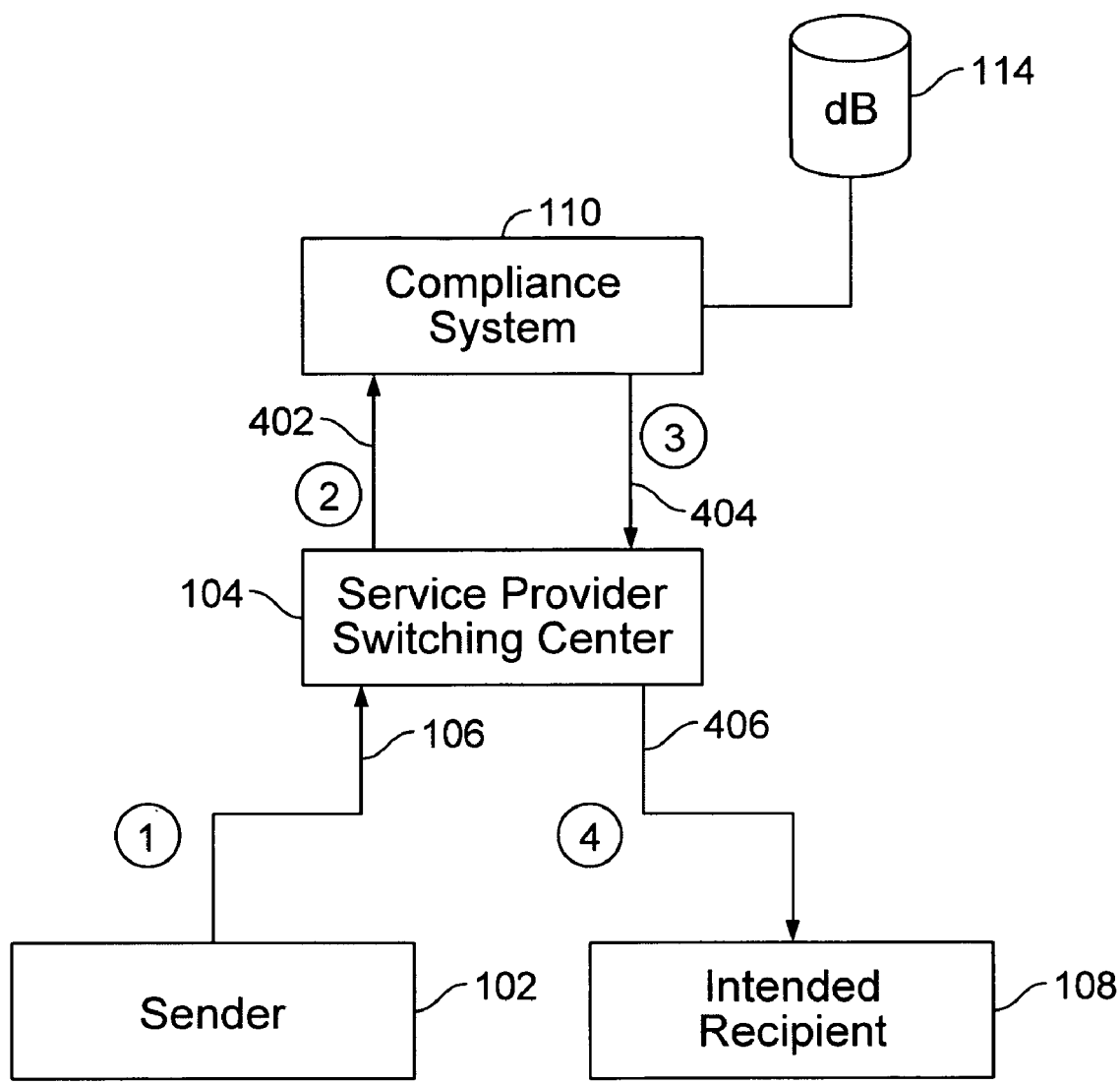
FIG. 4 is a block diagram illustrating data message redirection as implemented in one embodiment.

FIG. 4 is a block diagram illustrating data message redirection as implemented in one embodiment. In this example, the switching center 104 redirects the data message to compliance system 110 via communication path 402 and at least initially does not deliver the original data message to intended recipient 108. Compliance system 110 process the message as required by an applicable communication policy. In one embodiment, such processing includes making a determination as to whether the communication policy requires that the data message be blocked from deliver to intended recipient 108. If the policy requires the message to be blocked, compliance system 110 discontinues processing of the message without ever forwarding it on to intended recipient 108. If the message is not required to be blocked, compliance system forwards it to switching center 104 via path 404 for delivery to intended recipient 108. In one alternative embodiment, switching center 104 is configured to send to compliance system 110 a copy of the message for processing and later send the original message to intended recipient 108 via path 406 in response to receiving from compliance system 110 via path 404 an indication that the message is authorized to be delivered to intended recipient 108.

Figure 5:
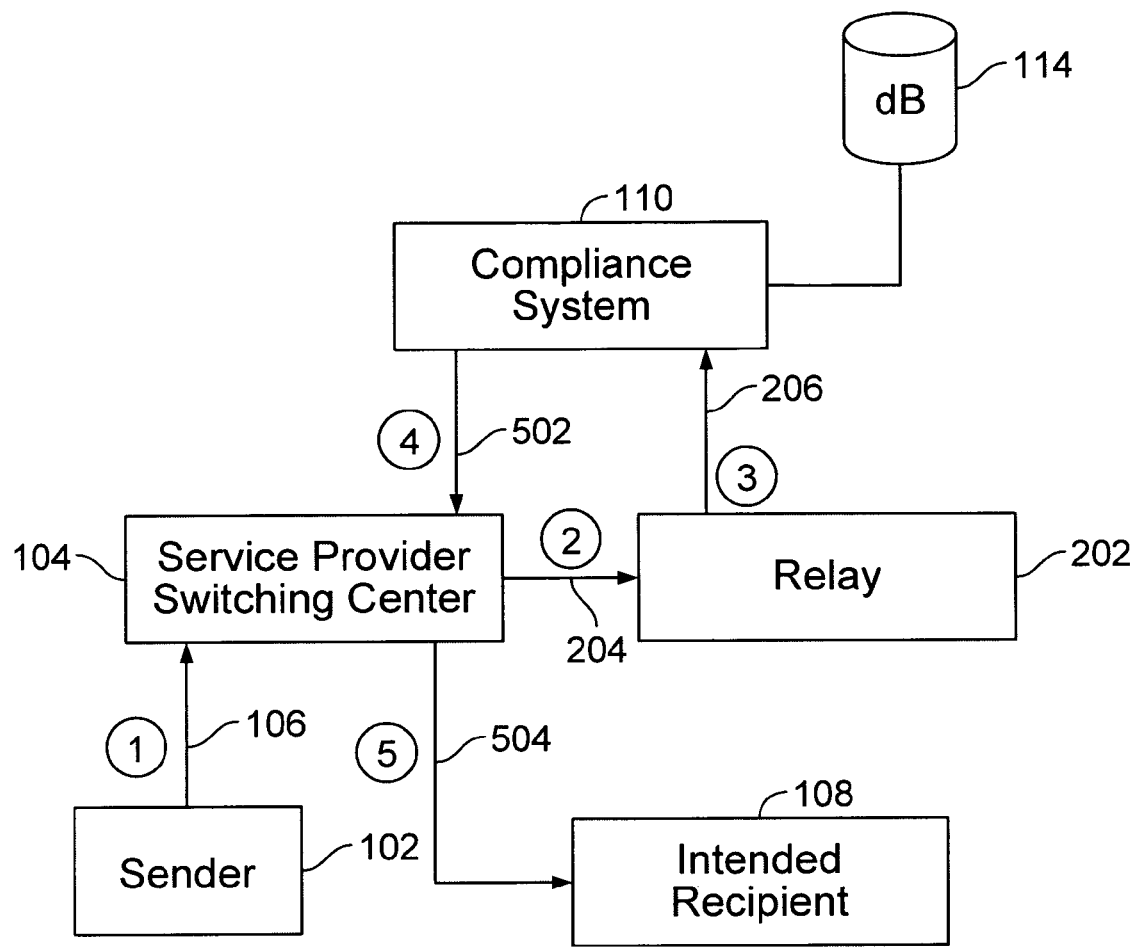
FIG. 5 is a block diagram illustrating data message redirection as implemented in one embodiment.

FIG. 5 is a block diagram illustrating data message redirection as implemented in one embodiment. In this example, switching center 104 is configured to redirect the data message to relay 202, instead of directly to compliance system 110. In one embodiment, this configuration allows the ownership, operation, and/or maintenance of the switching center 104, relay 202, and compliance system 110, as well as their associated functions as described herein, to be grouped and/or divided in any manner desired. For example, in one embodiment all three elements may be associated with the service provider with which switching center 104 is associated. In one embodiment, the relay 202, the compliance system 110, or both may be integrated into switching center 104. In this example, relay 202 forwards the received data message to compliance system 110. Compliance 110 process the data message in accordance with a policy. If it is determined the message is authorized under the policy, compliance system 110 forwards the message to switching center 104 via path 502 for delivery to intended recipient 108 via path 504.

Figure 6:
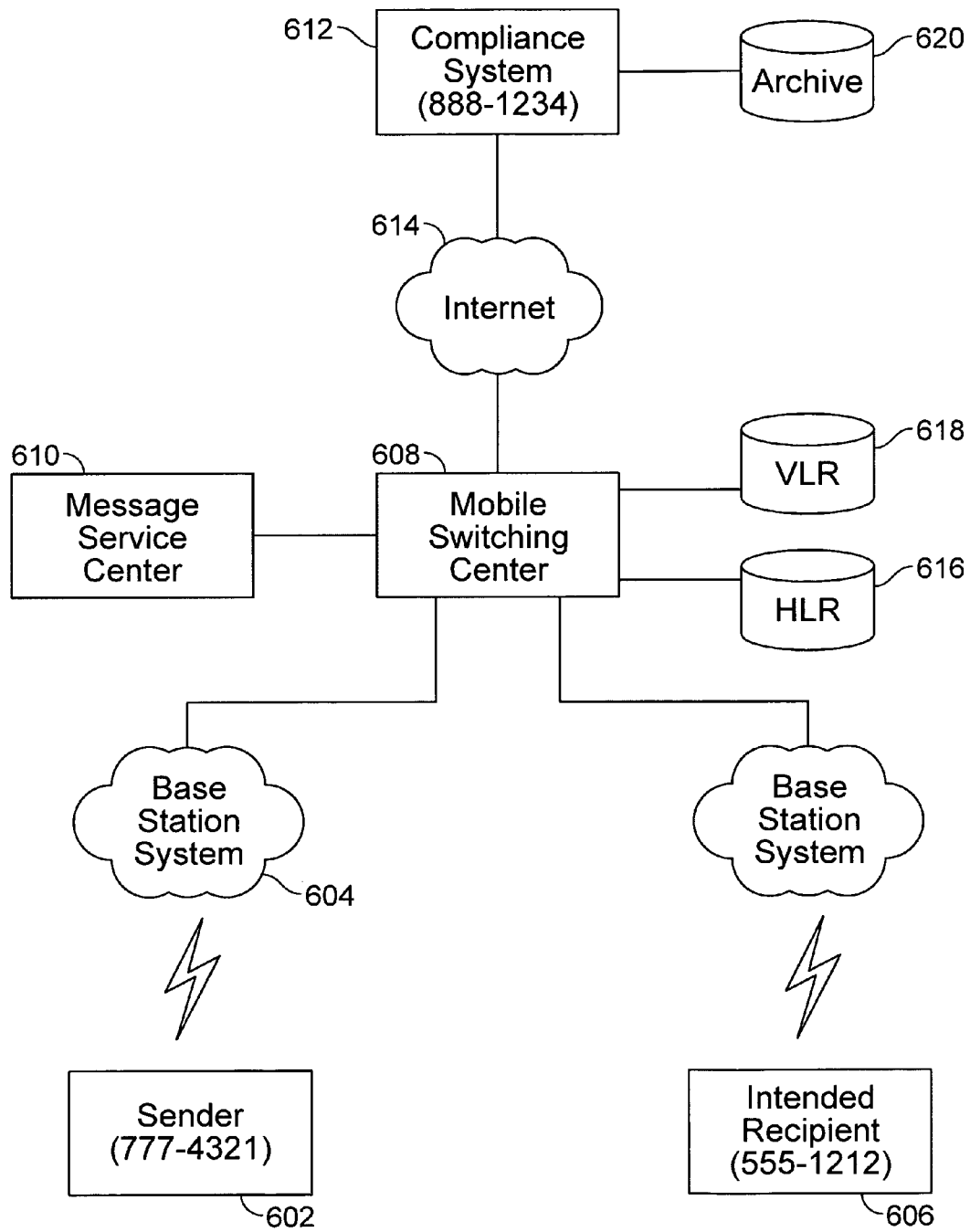
FIG. 6 is a block diagram illustrating data message mirroring and/or redirection as implemented in one embodiment.

FIG. 6 is a block diagram illustrating data message mirroring and/or redirection as implemented in one embodiment. In this example, a sender 602 generates and sends via wireless communication to a base station system 604 a mobile data message intended to be delivered to an intended recipient 606. In one embodiment, base station system 604 comprises an antenna configured to receive wireless transmissions from wireless equipment such as sender 602 and send received data via a communication link to a mobile switching center 608. In one embodiment, mobile switching center 608 comprises one or more processors and associated communication interfaces, memory, and other components and/or modules configured to process mobile communications being sent at least in part via a wireless telecommunications network with which the mobile switching center is associated. In one embodiment, the mobile data message comprises a short message service (SMS) or similar message. In one embodiment, the mobile data message is of a type that would normally be processed by a message service center 610 en route to being delivered via mobile switching center 608 to intended recipient 606, e.g., via a communication link to a base station system 612 configured to transmit the data message to intended recipient 606 via a wireless transmission. In the example shown, sender 602 and intended recipient 606 are served by different base station systems. However, the sender 602 and intended recipient 606 may instead by served by the same base station system, e.g., if they subscribed to service through the same service provider and happened to be in the same geographic area. In the example shown, sender 602 and intended recipient 606 are served by the same mobile switching center 608. However, the sender 602 and intended recipient 606 may instead be served by different mobile switching centers, e.g., because they are in different geographic locations served by different mobile switching centers or subscribe to service with different providers. In such cases, the respective mobile switching centers would exchange data through network and/or other communication links as required to provide for the exchange of mobile data messages between sender 602 and intended recipient 606, either directly or indirectly, depending on the embodiment.

In one embodiment, the mobile switch center 608 of FIG. 6 is configured to mirror a data message sent by sender 602 to intended recipient 606 to compliance system 612 via the Internet 614. In one embodiment, mobile switching center 608 sends a copy of the data message to compliance system 612 via an e-mail message sent via the Internet. In one such embodiment, the copy of the data message is encapsulated in the e-mail message. In one embodiment, the copy of the data message is sent as an attachment to the e-mail message. Any communication suitable for delivering a copy of the e-mail message to compliance system 612, and any network and/or other communication path suitable for sending a communication of the type used, may be used. In the example shown, the compliance system 612 is connected to an archive 620. In one embodiment, compliance system 612 is configured to store data associated with at least selected mobile data messages in archive 620.

In one embodiment, mobile switching center 608 is configured to mirror to compliance system 612 data messages sent by sender 602 based at least in part on subscriber profile data associated with sender 602. In one embodiment, the subscriber profile data is stored at least in part in a home location register (HLR) 616 associated with mobile switching center 608, if mobile switching center 608 is the "home" mobile switching center for sender 602. In one embodiment, if sender 602 is "roaming" outside the area served by the mobile switching center that serves as its "home", at least a portion of the subscriber profile data on which the determination to mirror to compliance system 612 the data message sent by sender 602 is stored in a visitor location register (VLR) 618 associated with mobile switching center 608. In one embodiment, mobile switch center 608 is configured to mirror to compliance system 612 data messages sent to intended recipient 606 based at least in part on subscriber profile data associated with intended recipient 606, which subscriber profile data likewise may be stored either in HLR 616 or VLR 618 depending on whether or not intended recipient 606 is roaming at the time the data message is being processed for delivery via mobile switching center 608. In one embodiment, making the sending and/or receiving user/equipment profile data stored in either the HLR 616 or VLR 618, as applicable, ensure that any required communication policy compliance processing is performed even when the user/equipment is roaming.

In one embodiment, mobile switching center 608 is configured to redirect to compliance system 612 a data message sent by sender 602 to intended recipient 606. In one such embodiment, mobile switching center 608 does not deliver the data message to intended recipient 606 and instead it is left to the compliance system 612 to determine whether the message will be forwarded to intended recipient 606, e.g., based on a communication policy applied by compliance system 612 to the data message, in which case the compliance system 612 sends the data message to intended recipient 606 via a communication (e.g., an SMS text or other mobile data message encapsulated or attached to an e-mail message) sent to mobile switching center 608 (or, in one embodiment, a gateway associated therewith) for delivery to intended recipient 606. In one embodiment, communications from mobile switching center 608 to compliance system 612 and/or communications from compliance system 612 to mobile switching center 608 and/or destinations associated therewith, such as intended recipient 606 in the example shown in FIG. 6, are processed by and/or sent via message service center 610.

Figure 7:
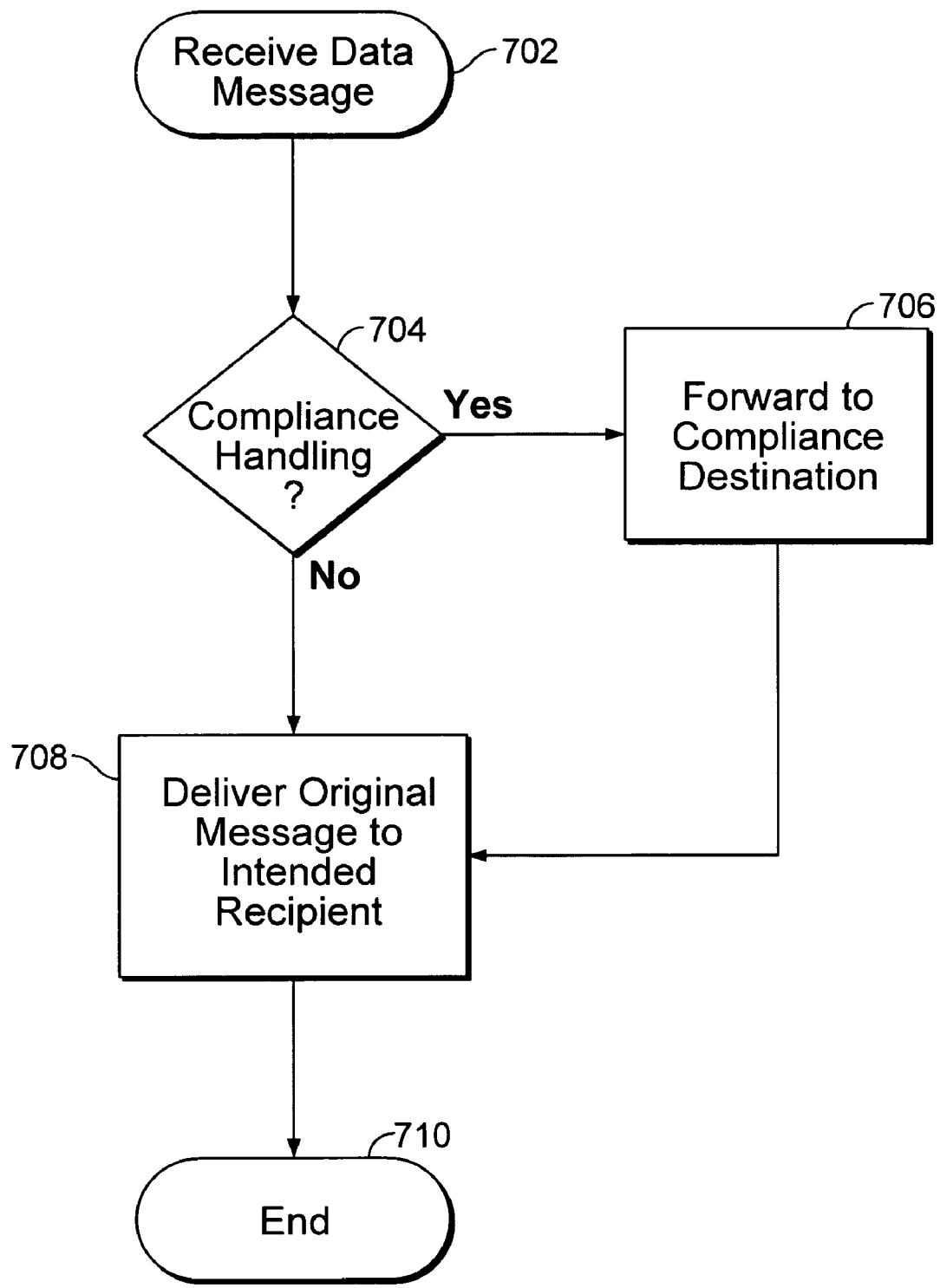
FIG. 7 is a flow chart illustrating a process used in one embodiment to selectively forward data messages to a compliance destination.

FIG. 7 is a flow chart illustrating a process used in one embodiment to selectively forward data messages to a compliance destination. In one embodiment, the process of FIG. 7 is implemented on a switching center, such as service provider switching center 104 in the example shown FIG. 1 or mobile switching center 608 of FIG. 6. In one embodiment, the process of FIG. 7 is implemented on a relay such as relay 202 in the examples shown in FIGS. 2 and 3. A data message addressed to an intended recipient is received (702). It is determined whether the data message should be mirrored to a compliance destination for processing in accordance with a communication policy (704). If it is determined the data message should be mirrored, a copy of the data message is sent to a compliance destination (706). In one embodiment, the compliance destination is a relay, such as relay 202 of FIG. 2. In one embodiment, the compliance destination is a compliance system, such as compliance system 110 of FIG. 1. If it is determined that compliance handling is not required (704) or if such processing is required once a copy of the data message has been forwarded to the appropriate compliance destination (706), the original data message is delivered to its intended recipient'(708), after which the process ends (710). In one embodiment 708 precedes 704 and, if applicable, 706. In one embodiment, 708 may be performed substantially concurrently with 704 and, if applicable, 706.

Figure 8:
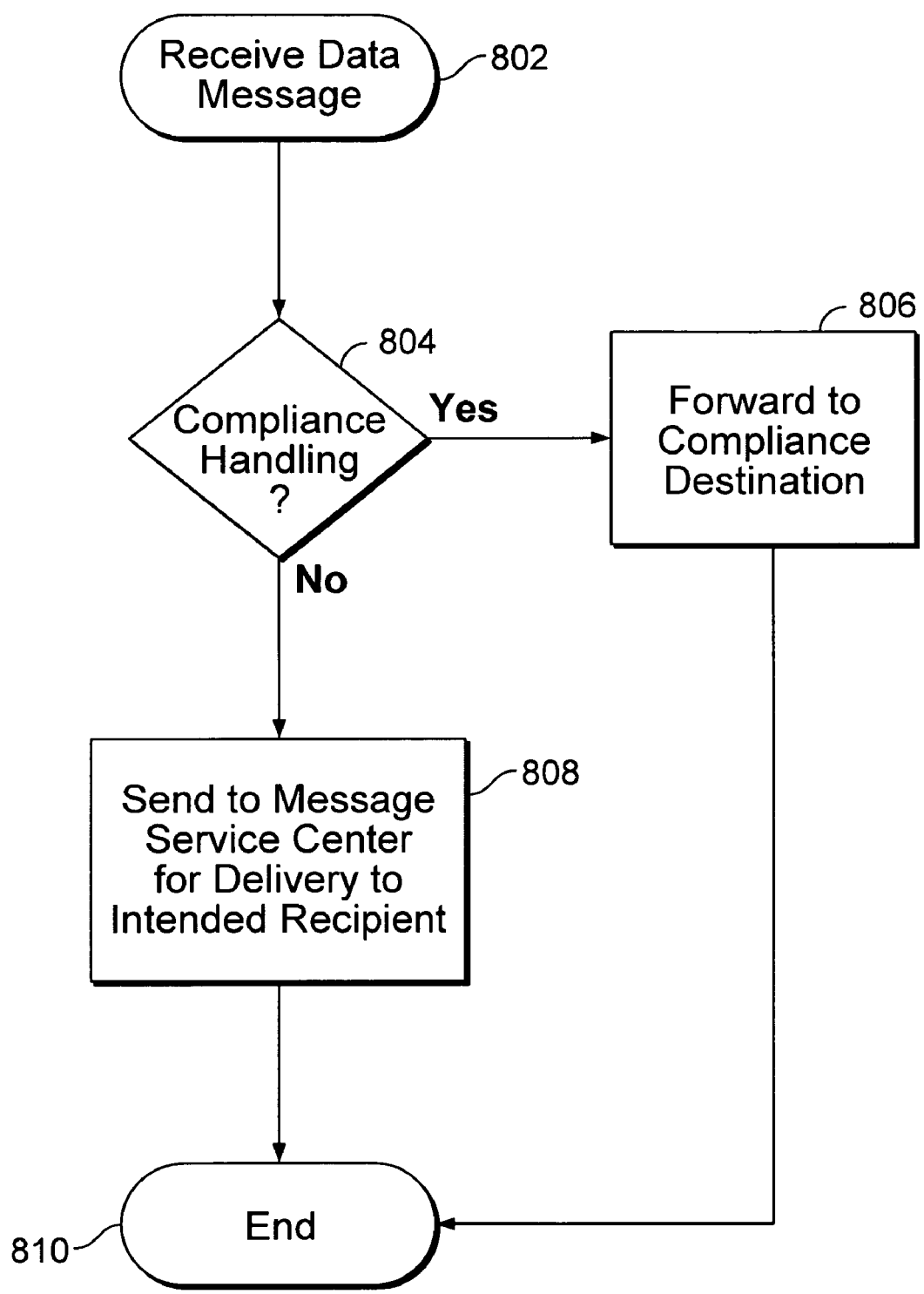
FIG. 8 is a flow chart illustrating a process used in one embodiment to redirect selected data messages to a compliance system.

FIG. 8 is a flow chart illustrating a process used in one embodiment to redirect selected data messages to a compliance system. In one embodiment, the process of FIG. 8 is implemented on a switching center such as service provider switching center 104 in the example shown in FIG. 4 or mobile switching center 608 of FIG. 6. In one embodiment, the process of FIG. 8 is implemented on a relay such as relay 202 in the example shown in FIG. 5. A data message addressed to an intended recipient is received (802). It is determined whether the data message should be redirected to a compliance destination for processing in accordance with a communication policy (804). If it is determined the data message should be redirected, a copy of the data message is sent to a compliance destination (806), after which the process ends (810). In one embodiment, the compliance destination is a relay, such as relay 202 of FIG. 5. In one embodiment, the compliance destination is a compliance system, such as compliance system 110 of FIG. 4. If it is determined that compliance handling is not required (804), the original data message is delivered to its intended recipient (808) and the process ends (810).

Figure 9:
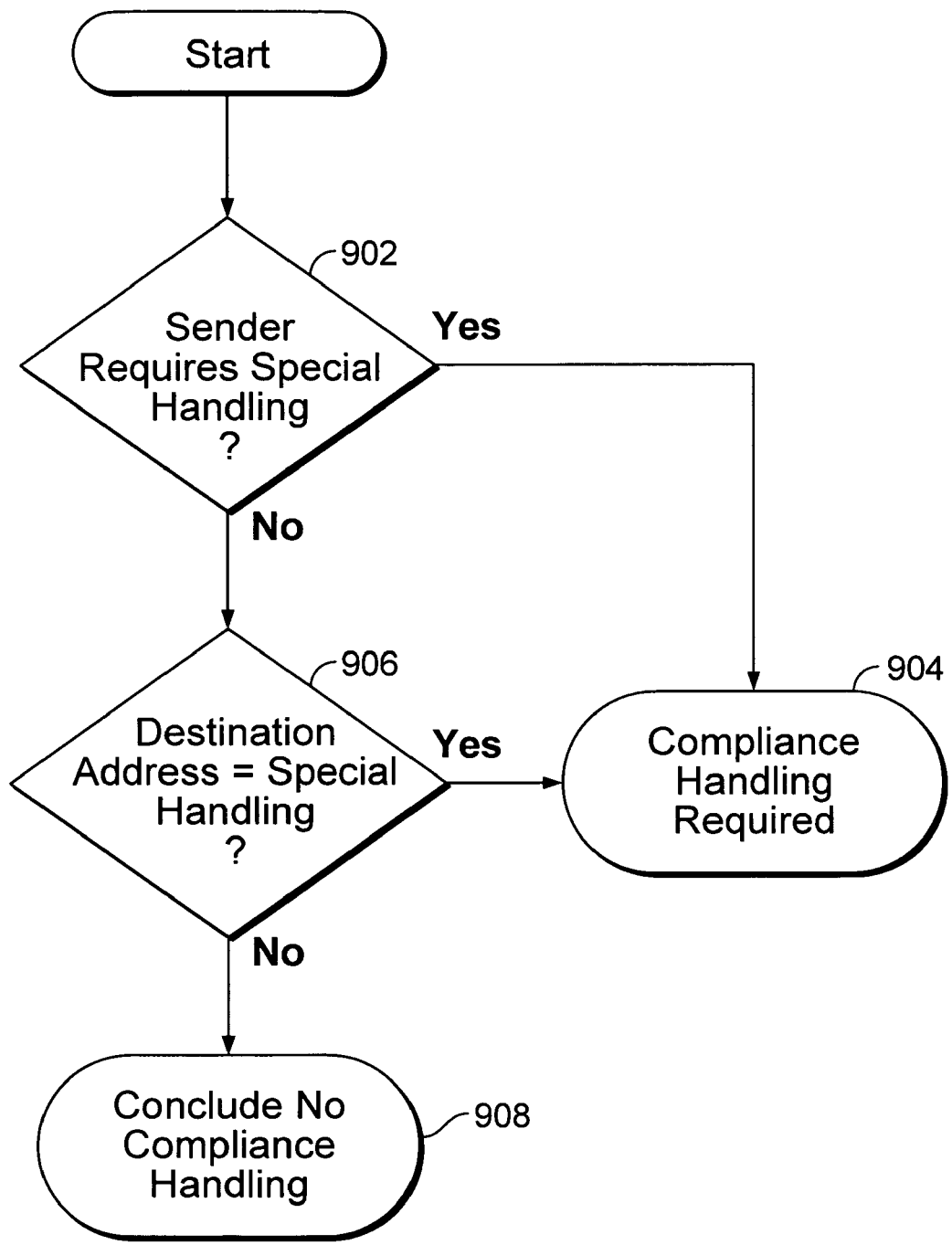
FIG. 9 is a flow chart of a process used in one embodiment to determine whether communication policy compliance handling should be performed with respect to a received data message.

FIG. 9 is a flow chart of a process used in one embodiment to determine whether communication policy compliance handling should be performed with respect to a received data message. In one embodiment, the process of FIG. 9 is used to implement 704 of FIG. 7. In one embodiment, the process of FIG. 9 is used to implement 804 of FIG. 8. It is determined whether outgoing data messages associated with a sender that sent the data message are required to be subjected to communication policy compliance handling (902). If so, it is concluded that compliance handling should be applied (904). If the sender is not a sender whose outgoing messages are to be subjected to compliance handling, it is determined whether a destination address associated with the data message is associated with an intended recipient whose incoming data messages are to be subjected to compliance handling (906). If so, it is concluded that compliance handling should be applied (904). If not, it is concluded that no communication policy compliance processing is required (908). In one embodiment, the process of FIG. 9 is implemented on a switching center and the data message is sent to a relay if it is determined that compliance handling is required for the message. In one such embodiment, the relay may be configured to perform a further level of analysis, e.g., one based at least in part on an analysis of the contents of the data message, to determine whether the data message should be forwarded to a compliance system such as compliance system 110 of FIG. 2.

Figure 10:
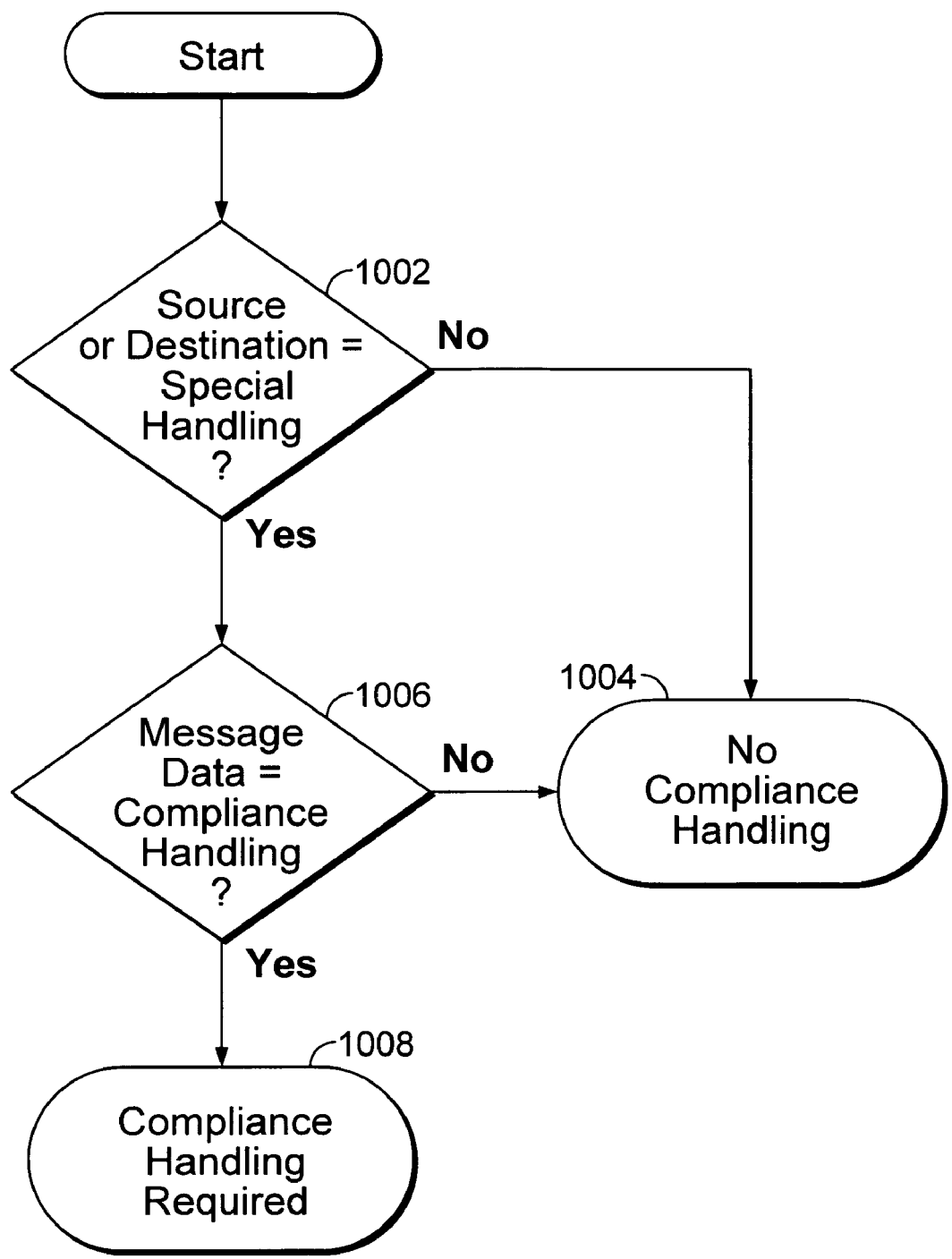
FIG. 10 is a flow chart of a process used in one embodiment to determine whether communication policy compliance handling should be performed with respect to a received data message.

FIG. 10 is a flow chart of a process used in one embodiment to determine whether communication policy compliance handling should be performed with respect to a received data message. In one embodiment, the process of FIG. 10 is used to implement 704 of FIG. 7. In one embodiment, the process of FIG. 10 is used to implement 804 of FIG. 8. It is determined whether outgoing data messages associated with a sender whose outgoing messages are required to be subjected to communication policy compliance handling or an intended recipient whose incoming messages are required to be subjected to such handling (1002). If not, it is concluded that compliance handling is not required (1004). If it is determined in 1002 that either outgoing messages from the sender or incoming messages to the intended recipient require further processing to determine whether the data message should be subjected to communication policy compliance handling, it is determined based on message data associated with the data message whether the data message should be subjected to communication policy compliance handling. In one embodiment, a data message may be subjected to compliance handling based at least in part on the identity of the sender, the intended recipient, and/or the sender-intended recipient pair. For example, in one embodiment, all messages from a particular sender may be identified in 1002 as requiring further processing, but only those messages to a particular destination address, or a prescribed range, set, or class of destination addresses, would be identified in 1006 as requiring communication policy compliance processing. In one embodiment, the contents of the data message are processed in 1006 and the determination whether compliance handling is required is made based at least in part on an analysis of such content. In one embodiment, natural language and/or other processing techniques are used to extract an index, summary, synopsis, subject, key words, and/or other information representative of and/or associated with the content of the data message, and the determination whether to apply compliance handling is based at least in part on such extracted information. In one embodiment, the message contents are searched for one or more key words and/or phrases and it is determined that compliance handling is required if one or more of such key words and/or phrases is/are found. If it is determined in 1006 that compliance handling is required, it is concluded that compliance handling should be applied (1008). If not, it is concluded that no communication policy compliance processing is required (1004).

Figure 11:
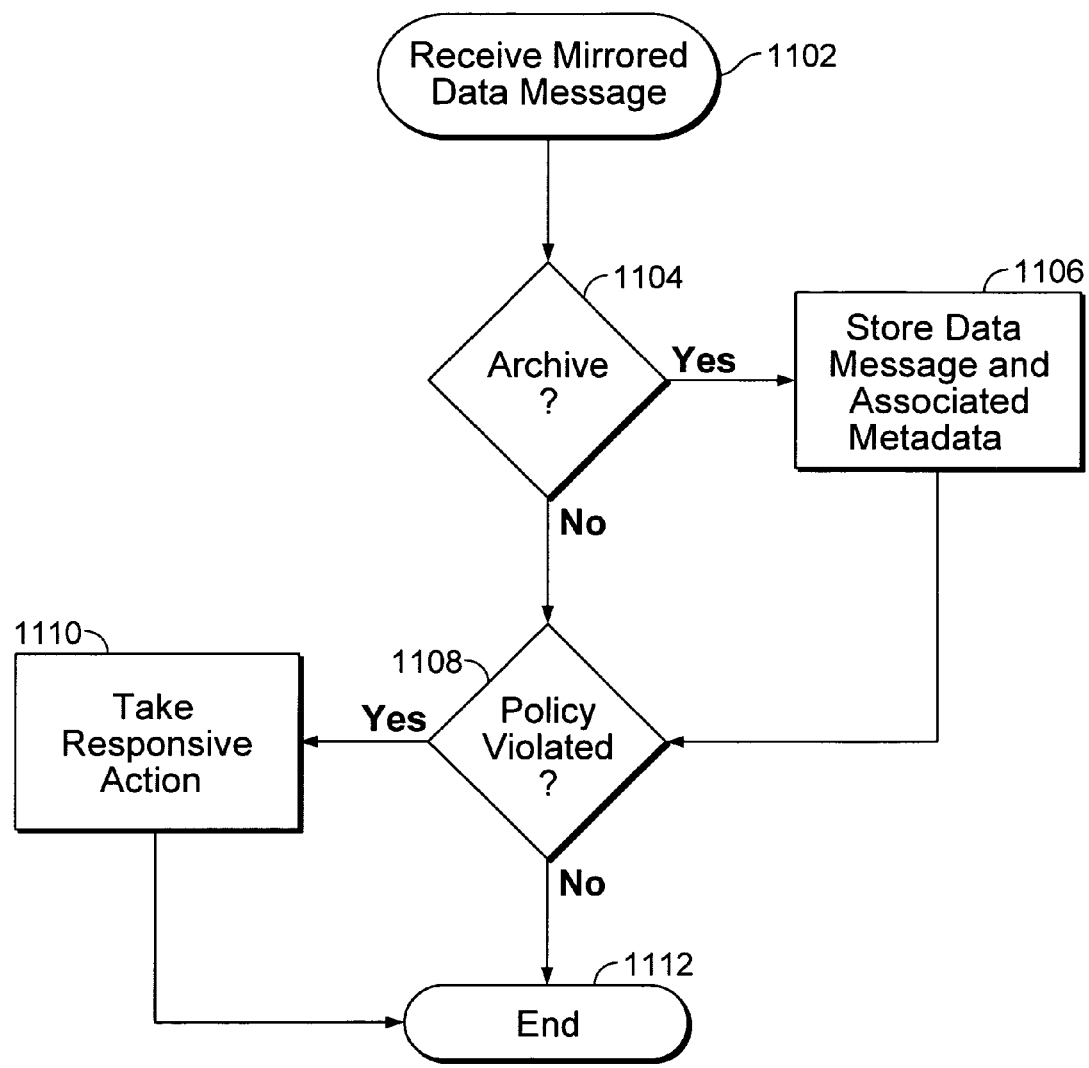
FIG. 11 is a flow chart illustrating a process used in one embodiment to process a mirrored copy of a data message.

FIG. 11 is a flow chart illustrating a process used in one embodiment to process a mirrored copy of a data message. In one embodiment, the process of FIG. 11 is implemented on a compliance system, such as compliance system 110 in the examples shown in FIGS. 1-3 or compliance system 612 of FIG. 6. A mirrored copy of a data message is received (1102). In one embodiment, the data message comprises a mobile data message, such as an SMS text message. In one embodiment, 1102 comprises extracting metadata from the data message. In one embodiment, metadata is extracted from a header portion of the data message, e.g., source and destination address information, subject line, sending protocol specific information, etc. In one embodiment, metadata is extracted by processing message content data associated with the message. In one embodiment, natural language and/or other processing techniques are used to extract metadata from the content of the data message, such as by identifying keywords or creating an index, summary, synopsis, and/or other representation of the contents. In one embodiment, metadata is extracted by classify the message contents by type of data (e.g., text, video, voice, audio, etc.).

It is determined whether data associated with the data message is to be archived (1104). In one embodiment, the determination whether to archive a message is based at least in part on metadata extracted from the data message. In one embodiment, the determination whether to archive a message is based at least in part on the contents of the message and/or the results of an analysis thereof. In one embodiment, a policy or rule may be applied to metadata and/or content associated with a message to determine whether the message is required to be archived. In one alternative embodiment, all messages are archived and 1104 is omitted from the process shown in FIG. 11. If the message is required to be archived, the message contents and associated metadata are stored (1106).

It is determined whether the data message violates a policy (1108). In one embodiment, metadata associated with the data message, message contents data associated with the data message, and/or a combination of the two are processed to determine if the data message violates a policy. For example, a data message sent to a destination to which the sender is not authorized to communicate using a data message of the type being processed, e.g., per a policy of a corporate or other enterprise with which the sender is associated, may be determined based on metadata (e.g., destination address information, or sender-destination pair information) associated with the message. As another example, a data message containing proscribed content, such as obscene, harassing, or discriminatory content, may be determined to violate a policy proscribing communications containing such content based on an analysis of message content data. As a further example, a data message may be determined to violate a policy proscribing the sending of content that is permitted to be sent to certain destinations but not others, such as one permitting confidential business information to be sent among employees of a business but not to third parties, based on a combination of metadata (i.e., the destination address) and message contents data (i.e., the confidential business information). If it is determined that a data message violates a policy, responsive action is taken (1110). In one embodiment the responsive action may include sending a notice to the sender, the sender's supervisor, and/or a communication policy compliance administrator or other authorized person. In one embodiment, the responsive action may include logging information associated with the data message. After such responsive action is taken, or if no violation is found, the process ends (1112).

Figure 12:
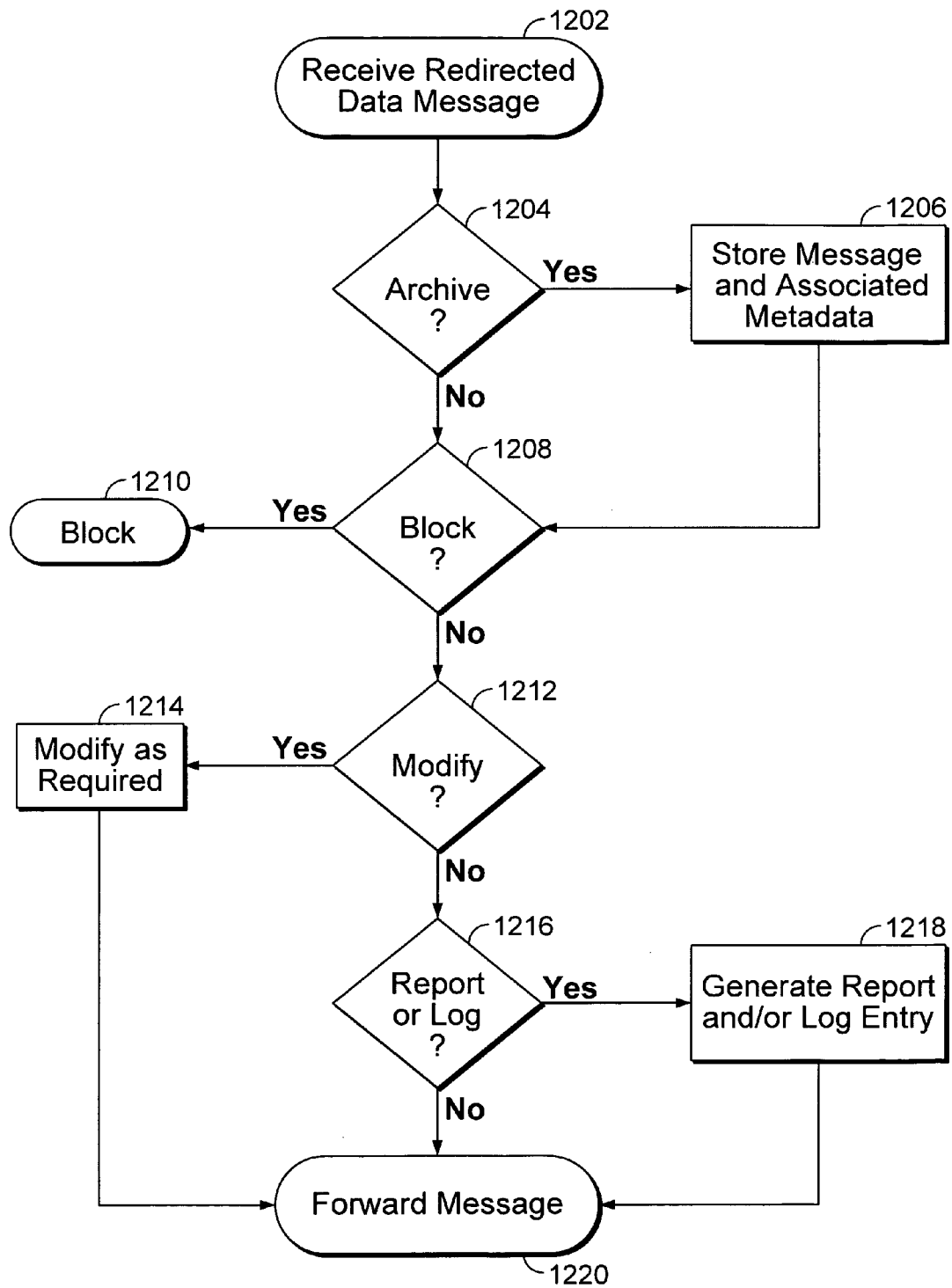
FIG. 12 is a flow chart illustrating a process used in one embodiment to process a redirected data message.

FIG. 12 is a flow chart illustrating a process used in one embodiment to process a redirected data message. In one embodiment, the process of FIG. 12 is implemented on a compliance system, such as compliance system 110 in the examples shown in FIGS. 4 and 5 or compliance system 612 of FIG. 6. A redirected data message is received (1202). It is determined whether data associated with the data message is to be archived (1204). If the message is required to be archived, the message contents and associated metadata are stored (1206). It is determined whether the data message is required to be blocked (1208). In one embodiment, a message may be blocked if it fails a test and/or violates a policy or rule. The determination whether to block a message may be based on an analysis of the message contents and/or metadata associated with the message. For example, messages containing content determined to be obscene, harassing, or discriminatory may be blocked. Likewise, messages to and/or from a particular address and/or range of addresses may be blocked. A combination of messages contents and metadata may also be used to determine whether a message should be blocked, e.g., to prevent the disclosure of trade secret and/or other confidential business information to a recipient that is not part of the sender's organization. If it is determined that the message is to be blocked, the message is blocked (1210), i.e., it is not forwarded on to the intended recipient. In one embodiment, the blocking process includes sending a notification to the sender and/or an administrator. In one embodiment, the blocking process includes logging data associated with the blocked data message. If the message is not required to be blocked, it is determined whether the message is required to be modified (1212). For example, in one embodiment a compliance system may be configured to cure certain defects in a message, such as by deleting offensive language or content and/or replacing such language with more appropriate language or content. In one embodiment, a message that does not satisfy a policy or rule may be cured by appending a disclaimer, warning, or other statement or content to the message. If the message is required to be modified, any required modifications are made (e.g., modifying the content and/or appending any content required to be added) (1214) prior to sending the modified message on to its intended final destination (1220). In one embodiment, data associated with a message that is modified in 1214 is logged. If the message is not required to be modified, it is determined whether data associated with the message is required to be reported and/or logged (1216). If so, any required report or log entry is generated and sent (1218). The message is sent to the intended final destination (1220).

Figure 13:
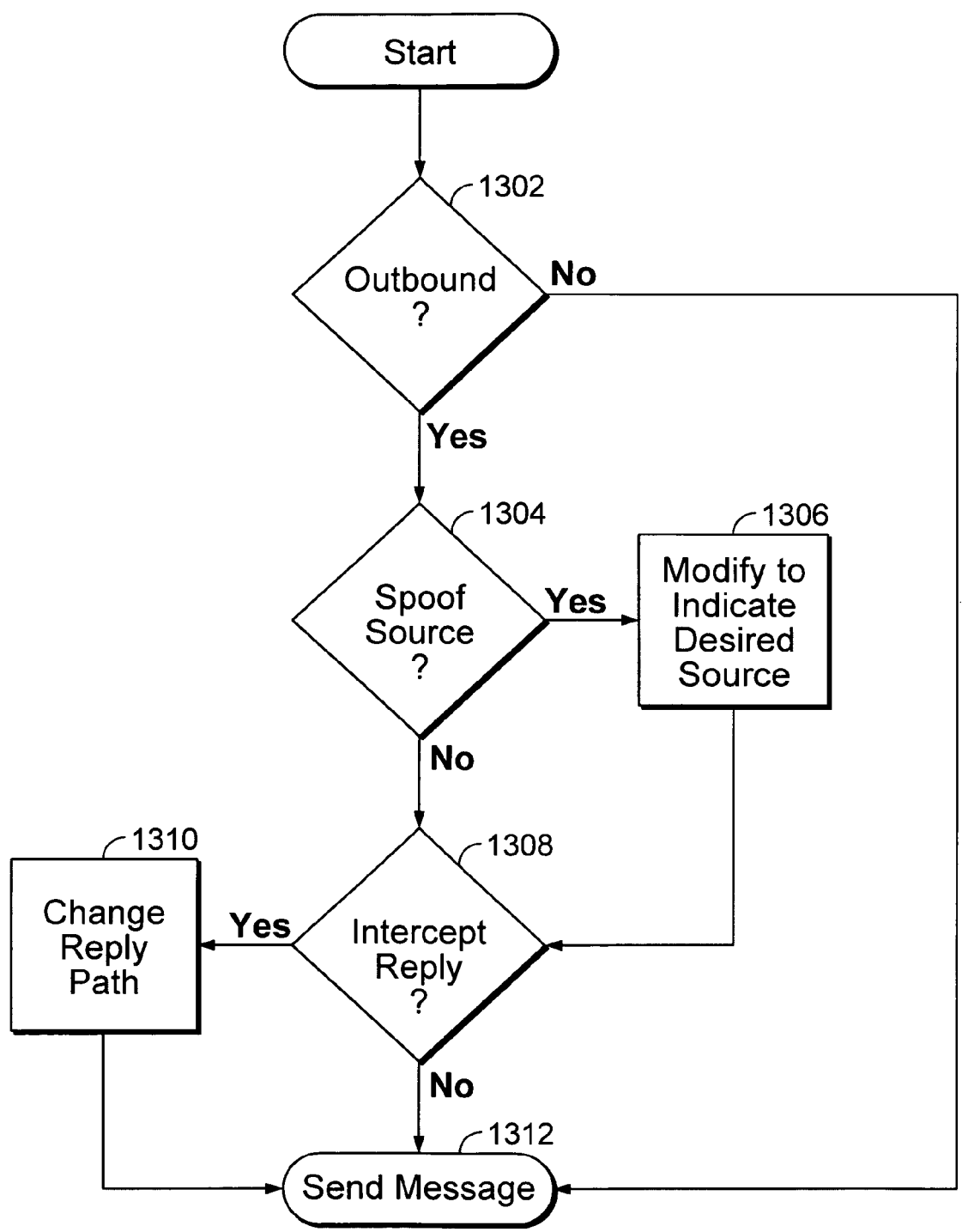
FIG. 13 is a flow chart illustrating a process used in one embodiment to forward a redirected data message to its intended recipient.

FIG. 13 is a flow chart illustrating a process used in one embodiment to forward a redirected data message to its intended recipient. In one embodiment, the process of FIG. 13 is used to implement 1220 of FIG. 12. It is determined whether the data message is an outbound data message (1302). In one embodiment, a data message is determined in 1302 to be an outbound data message if it was redirected for compliance processing at the behest of an entity with which a sending user associated with the data message, a sending equipment used to send the data message, and/or both is/are associated. By contrast, in one embodiment a data message is determined in 1302 to not be an outbound message if it was redirected for compliance processing at the behest of an entity with which the intended recipient user and/or equipment is/are associated and the sending user and/or equipment is/are not associated. If it is determined in 1302 that the data message is not an outbound data message, it is sent to the intended recipient (1312). If it is determined at 1302 that the data message is an outbound message, it is determined whether the source of the data message is to be "spoofed" so that it appears to the intended recipient that the source of the message is a node other than the sender (and/or the compliance system) (1304). If it is determined in 1304 that the source is to be changed, source information in the data message is changed to indicate the desired source (1306). In one embodiment, if the data message as forwarded by the source would otherwise appear to the intended recipient to have been sent to the intended recipient by the compliance system and it is desired that the message instead appear to the intended recipient to have been sent by the sender, e.g., to conceal from the intended recipient that compliance processing has been performed by the compliance system, the source address is spoofed to indicate that the sender is the source. In one embodiment, the data message may be a broadcast message, the source for each instance of which may be changed in accordance with a policy. For example, a new product announcement sent out by a product group to all customers may be modified before being sent to each respective customer to indicate the name of a sales representative associated with that customer as the source. It is determined whether reply path and/or address data associated with the data message should be changed to ensure that replies to the data message are received and processed by the compliance system (1308). If so, reply path and/or address data is modified as required (1310). In one embodiment, the source address is changed from the sender's address to the compliance system's address, so that the intended recipient will reply and/or send future messages intended for the sender of the original data message to the compliance system, instead of directly to the sender. In one embodiment, network address translation and/or similar techniques are used to implement such source address changes. Referring further to the example shown in FIG. 6, if the sender's actual mobile telephone number were 777-4321 and it was desired that replies and/or future messages from the intended recipient at 777-4321 be sent to the sender via compliance system 612 at 888-1234, address translation would be used to indicate to the intended recipient that the message was sent by sender 602 at 888-1234, i.e., the address associated with the compliance system 612. If the original data message were a broadcast message such as described above, or if address spoofing were otherwise desired, the message originated by sender 602 using equipment associated with address 777-4321 could be modified to appear to the intended recipient 606 to have come from "Sales Rep A" at 888-1234, with address translation techniques being used by compliance system 612 to process and route any replies and/or other future messages sent by the intended recipient to "Sales Rep A" at that address. The message, modified as applicable in 1306 and/or 1310, is sent to the intended recipient (1312).

Using the approaches described herein, mobile data messages may be mirrored or redirected for communication policy compliance processing by implementing the techniques described herein on one or more elements of a mobile or wireless network and/or third party relay equipment to which such a network may be configured to route traffic that does or may require such processing. Moreover, effective policy compliance monitoring and/or enforcement is achieved even though the sending or receiving equipment to which the policy applies may send/receive communications from different geographic locations serviced by different entry points on the mobile or wireless network.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of processing data messages, comprising:
receiving from a sending mobile device a mobile data message that is transmitted at least in part via a mobile communication network, wherein the mobile data message includes at least some message content generated at the sending mobile device;
determining, using a processor, whether the mobile data message requires communication policy compliance handling at a communication policy compliance destination, wherein the communication policy compliance destination is neither the sending mobile device nor an intended recipient of the mobile data message; and
sending the mobile data message or a copy thereof to the communication policy compliance destination if it is determined that the mobile data message requires communication policy compliance handling, wherein communication policy compliance handling is performed on the sent mobile data message or the copy thereof at the communication policy compliance destination.

2. A method as recited in claim 1, wherein the mobile data message is received at one or more of the following: a network element associated with a provider network, a mobile switching center associated with a provider network, a message handling center associated with a provider network, or a message processing center associated with a provider network.

3. A method as recited in claim 1, wherein the mobile data message is received at a relay to which a network element associated with a provider network routed the data message.

4. A method as recited in claim 1, wherein the determination whether the mobile data message requires communication policy compliance handling is based at least in part on address data associated with the mobile data message.

5. A method as recited in claim 1, wherein the determination whether the mobile data message requires communication policy compliance handling is based at least in part on data associated with one or more of the following: a sender of the mobile data message and an intended recipient of the mobile data message.

6. A method as recited in claim 1, wherein the determination whether the mobile data message requires communication policy compliance handling is based at least in part on data stored in a subscriber information database associated with a provider network.

7. A method as recited in claim 1, wherein the determination whether the mobile data message requires communication policy compliance handling includes analyzing the contents of the mobile data message to determine whether communication policy compliance handling is required based on the analysis of the contents of the mobile data message.

8. A method as recited in claim 1, further comprising determining whether the mobile data message is required to be modified to comply with a communication policy and modifying the mobile data message prior to its being delivered to an intended recipient associated with the mobile data message if it is determined that the mobile data message is required to be modified to comply with the communication policy.

9. A method as recited in claim 1, further comprising determining whether a communication policy requires that archive data associated with the mobile data message be stored and storing said archive data if it is determined that the communication policy requires said archive data to be stored.

10. A method as recited in claim 1, further comprising forwarding the mobile data message to an intended recipient associated with the mobile data message.

11. A method as recited in claim 10, wherein forwarding the mobile data message comprises determining whether a source identifier associated with the mobile data address should be changed.

12. A method as recited in claim 10, wherein forwarding the mobile data message comprises determining whether data associated with the mobile data address should be changed as required to ensure that a reply mobile data message sent by the intended recipient in reply to the original mobile data message is routed to the communication policy compliance destination.

13. A method as recited in claim 1, wherein the mobile data message includes a secondary data message and sending the mobile data message includes opportunistically sending the mobile data message using channel bandwidth that is not being used to exchange data of a primary type.

14. A method as recited in claim 1, wherein the determination whether the mobile data message requires communication policy compliance handling includes:
  accessing a location register to obtain subscriber profile data associated with a sender of the mobile data message or the intended recipient of the mobile data message; and
  determining, based on the subscriber profile data obtained from the location register, whether the mobile data message requires communication policy compliance handling.

15. A system for processing data messages, comprising:
  a communication interface; and
  a processor configured to:
    receive from a sending mobile device a mobile data message that is transmitted at least in part via a mobile communication network, wherein the mobile data message includes at least some message content generated at the sending mobile device;
    determine whether the mobile data message requires communication policy compliance handling at a communication policy compliance destination, wherein the communication policy compliance destination is neither the sending mobile device nor an intended recipient of the mobile data message; and
    send the mobile data message or a copy thereof to the communication policy compliance destination via the communication interface if it is determined that the mobile data message requires communication policy compliance handling, wherein communication policy compliance handling is performed on the sent mobile data message or the copy thereof at the communication policy compliance destination.

16. A system as recited in claim 15, wherein the processor is configured to determine whether the mobile data message requires communication policy compliance handling by analyzing the contents of the mobile data message to determine whether communication policy compliance handling is required based on the analysis of the contents of the mobile data message.

17. A system as recited in claim 15, wherein the processor is configured to determine whether the mobile data message requires communication policy compliance handling by:
  accessing a location register to obtain subscriber profile data associated with a sender of the mobile data message or the intended recipient of the mobile data message; and
  determining, based on the subscriber profile data obtained from the location register, whether the mobile data message requires communication policy compliance handling.

18. A non-transitory computer readable storage medium and comprising computer instructions for:
  receiving from a sending mobile device a mobile data message that is transmitted at least in part via a mobile communication network, wherein the mobile data message includes at least some message content generated at the sending mobile device;
  determining whether the mobile data message requires communication policy compliance handling at a communication policy compliance destination, wherein the communication policy compliance destination is neither the sending mobile device nor an intended recipient of the mobile data message; and
  sending the mobile data message or a copy thereof to the communication policy compliance destination if it is determined that the mobile data message requires communication policy compliance handling, wherein communication policy compliance handling is performed on the sent mobile data message or the copy thereof at the communication policy compliance destination.

19. A non-transitory computer readable storage medium as recited in claim 18, wherein the computer instructions for determining whether the mobile data message requires communication policy compliance handling include computer instructions for analyzing the contents of the mobile data message to determine whether communication policy compliance handling is required based on the analysis of the contents of the mobile data message.

20. A non-transitory computer readable storage medium as recited in claim 18, wherein the computer instructions for determining whether the mobile data message requires communication policy compliance handling include computer instructions for:
  accessing a location register to obtain subscriber profile data associated with a sender of the mobile data message or the intended recipient of the mobile data message; and
  determining, based on the subscriber profile data obtained from the location register, whether the mobile data message requires communication policy compliance handling.

* * * * *